US007656795B2

(12) United States Patent
Jakubik et al.

(10) Patent No.: US 7,656,795 B2
(45) Date of Patent: Feb. 2, 2010

(54) PREVENTING DUPLICATE SOURCES FROM CLIENTS SERVED BY A NETWORK ADDRESS PORT TRANSLATOR

(75) Inventors: Patricia A. Jakubik, Raleigh, NC (US); Linwood Hugh Overby, Jr., Raleigh, NC (US); Joyce Anne Porter, Apex, NC (US); David John Wierbowski, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 10/907,661

(22) Filed: Apr. 11, 2005

(65) Prior Publication Data

US 2006/0227807 A1 Oct. 12, 2006

(51) Int. Cl.
*G01R 31/08* (2006.01)
(52) U.S. Cl. .................... 370/230; 370/395.54; 709/219
(58) Field of Classification Search ................. 370/466, 370/230, 395.5; 709/219
See application file for complete search history.

(56) References Cited

U.S. PATENT DOCUMENTS

| 6,615,357 | B1 | 9/2003 | Boden et al. | |
|---|---|---|---|---|
| 2003/0043740 | A1* | 3/2003 | March et al. | 370/229 |
| 2003/0233452 | A1* | 12/2003 | Maufer et al. | 709/225 |
| 2004/0071149 | A1 | 4/2004 | Kim et al. | |
| 2004/0088537 | A1 | 5/2004 | Swander et al. | |
| 2004/0143758 | A1* | 7/2004 | Swander et al. | 713/201 |
| 2005/0166206 | A1* | 7/2005 | Parson | 718/104 |

OTHER PUBLICATIONS

Sternberg, M. et al, "IPsec NAT-Traversal draft-stenberg-spec-nat-traversal-02.txt" IETF Standard-Working-Draft, Internet Engineering Task Force, IETF, CH, No. 2, 28, Feb. 2001.
Pouseele, S., "How to Pass IPSec traffic through ISA Server," http://www.isaserver.org/pages/article_p.asp?id=1072, last update Mar. 26, 2005.
Huttunen, A, "UDP Encapsulated of IPSec ESP Packets," Network Working Group, RFC 3948, The Internet Society, Jan. 2005, pp. 1-15.
"IPsec-Network Address Translation (NAT) Compatibility Requirements", Request for Comments: 3715, Category: Informational, B. Aboba, et al, Microsoft, Mar. 2004. pp. 1-17.

(Continued)

*Primary Examiner*—Seema S Rao
*Assistant Examiner*—Sai-Ming Chan
(74) *Attorney, Agent, or Firm*—Hoffman Warnick

(57) ABSTRACT

Preventing duplicate sources on a protocol connection that uses network addresses, protocols and port numbers to identify source applications that are served by a NAPT. If an arriving packet encapsulates an encrypted packet and has passed through an NAPT en route to the destination host, the encapsulated packet is decrypted to obtain an original source port number and original packet protocol from the decrypted packet. A source port mapping table (SPMT) is searched for an association between the NAPT source address, the original source port, and the original packet protocol associated with the NAPT source address and port number. If an incorrect association is found, the packet is rejected as representing an illegal duplicate source; that is, a second packet from a different host served by a NAPT that is USING the same SOURCE port and protocol.

11 Claims, 5 Drawing Sheets

OTHER PUBLICATIONS

"Dynamic Host Configuration Protocol (DHCPv4) Configuration of IPsec Tunnel Mode", Request for Comments: 3456, Category: Standards Track, B. Patel, Intel Corp; B. Aboba, Microsoft; S. Kelly, Airespace: V. Gupta, Sun Microsystems, Inc. Jan. 2003. pp. 1-17.

"UDP Encapsulation of IPsec ESP Packets", Request for Comments: 3948, Category: Standards Track, A. Huttunen, F-Secure Corp.; B. Swander, Microsoft; V. Volpe, Cisco Systems; L DiBurro, Nortel Networks, M. Stenberg, Jan. 2005. Pages 1-15.

"Negotiation of NAT-Traversal in the IKE", Request for Comments: 3947, Category: Standards Track, T. Klvinen, SafeNet; B. Swander, Microsoft; A. Huttunen, F-Secure Corporation; V. Volpe, Cisco Systems; Jan. 2005, pp. 1-15.

"User Datagram Protocol", RFC 768, J. Postel, ISI, Aug. 28, 1980, pp. 1-3.

Traditional IP Network Address Translator (Traditional NAT), Request for Comments: 3022, Obsoletes: 1631, Category: Informational, P. Srisuresh, Jasmine Networks; K. Egevang, Intel Corporation, Jan. 2001.

"Security Architecture for the Internet Protocol", Request for Comments: 2401, Obsoletes: 1825, Category: Standards Track, S. Kent, BBN Corp.: R. Atkinson@Home Network, Nov. 1998.

IP Encapsulating Security Payload (ESP), Request for Comments: 2406, Obsoletes: 1827, Category: Standards Track, S. Kent, BBN Corp; R.Atkinson@home Network, Nov. 1998.

* cited by examiner

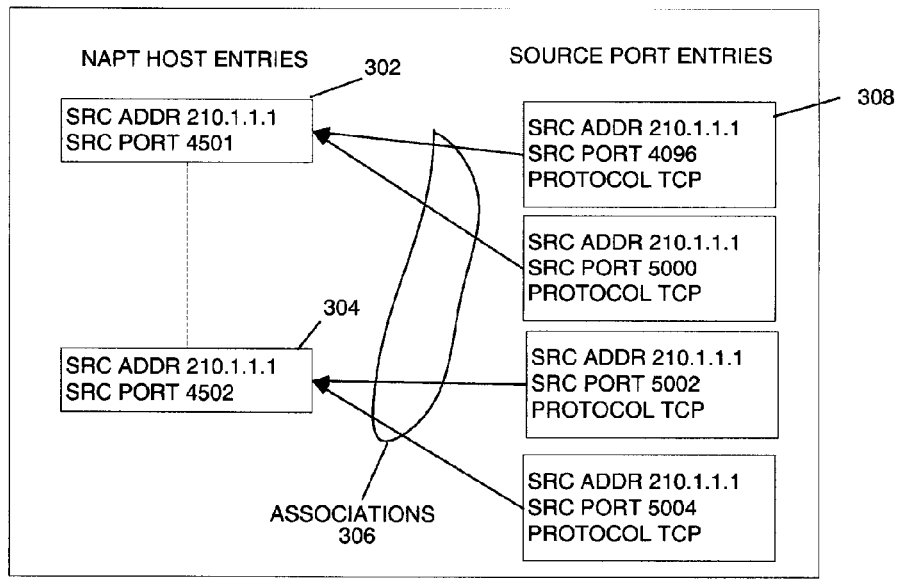

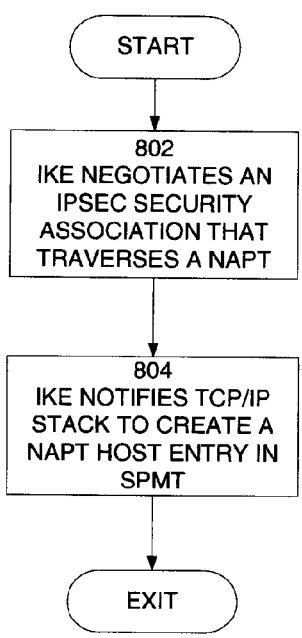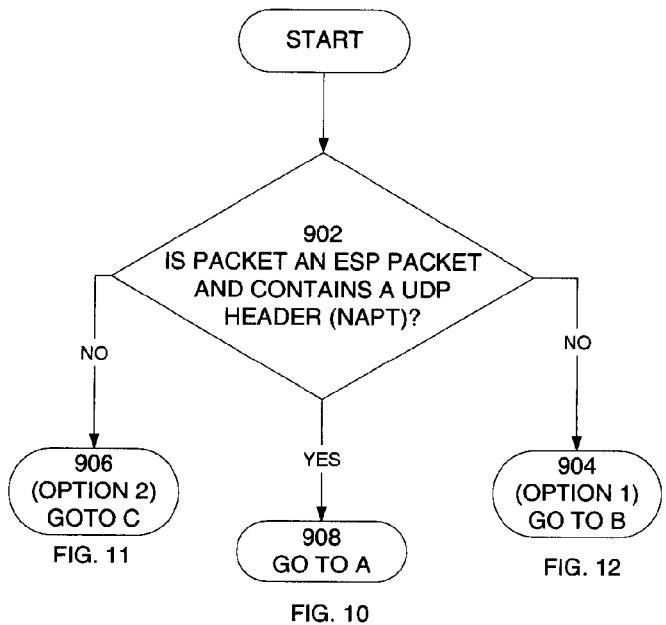

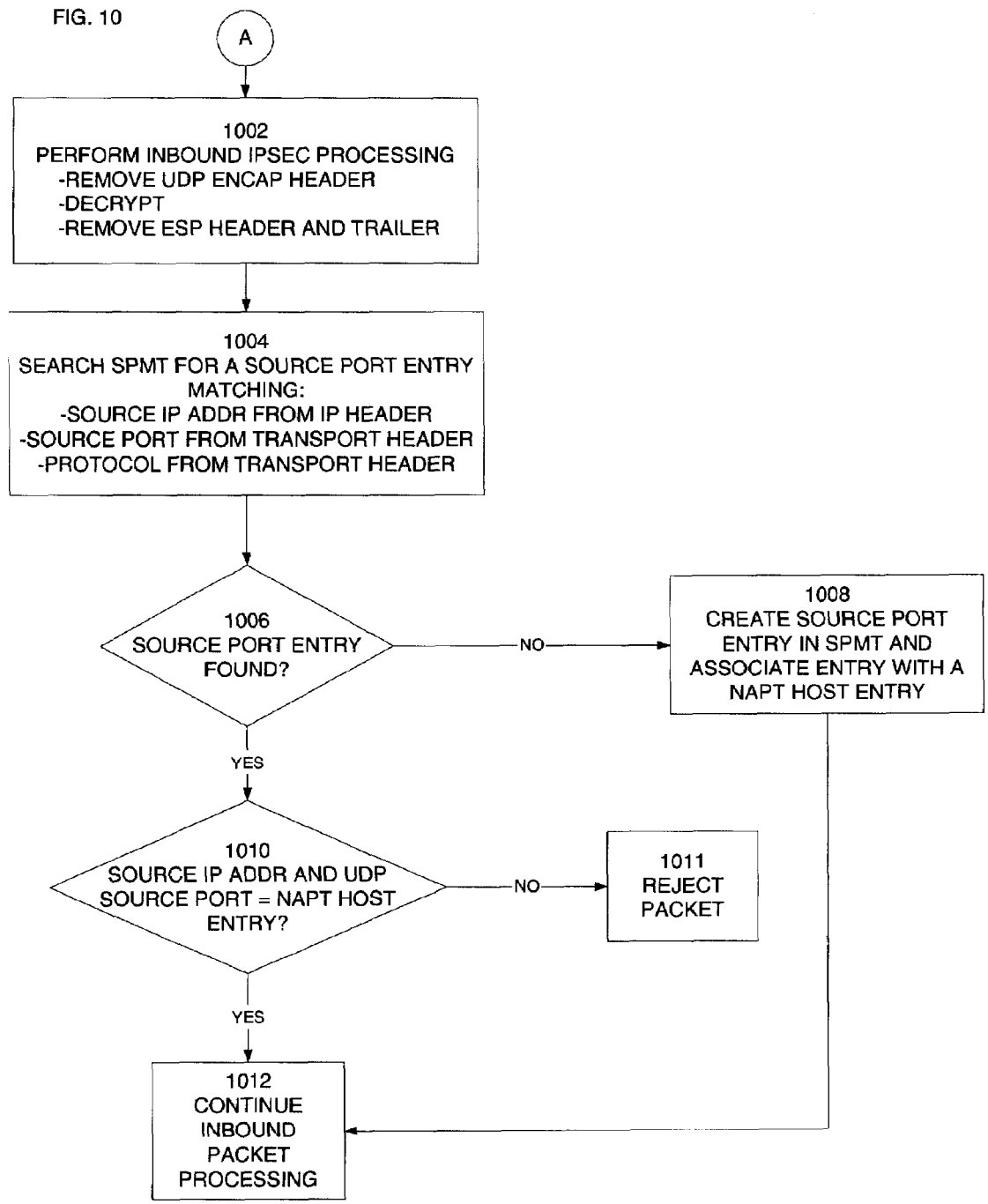

PREVENTING DUPLICATE SOURCES FROM CLIENTS SERVED BY A NETWORK ADDRESS PORT TRANSLATOR

TECHNICAL FIELD

The invention relates generally to internet networking and specifically to addressing conflicts caused by network address and port translation.

BACKGROUND OF THE INVENTION

The problems and solutions addressed by the invention are described herein in terms of the Internet and the TCP/IP protocols that form the basis of Internet communications. However, the invention can apply to other communication protocols as well, depending on the specifics of the protocols.

Internet Network Address Translation is used for several reasons. The main reason is to economize on the use of public addresses. The Internet Protocol (IP) address of a Network Address Translator (NAT) is generally a public address. That is, the NAT IP address is known to the outside world, while all of the servers or clients behind the NAT are private addresses, unknown to the outside world. In such a case, the outside world communicates with the NAT and the NAT controls the communications with the appropriate servers and clients behind it. This means that the IP addresses of devices behind the NAT only have to be unique within that family, but can be duplicative of other IP addresses in the rest of the world. NATs involve only the translation of IP addresses. There is a further type of translation known as Network Address Port Translation (NAPT) in which both IP addresses and port numbers are translated. The standards for Network Address Translation (NAT) and Network Address Port Translation (NAPT) are set forth in the Internet Engineering Task Force (IETF) RFC 3022, entitled "Traditional IP Network Address Translation".

The original Internet was not designed with security as a primary factor. In fact, the Internet was purposely made relatively open as an aid to scientific and educational communication. However, the advent of the Web and its commercial uses has increased the need for secure Internet communications. The Internet Security Protocol, commonly known as IPsec, was defined to address these issues. For example, IPsec provides for the authentication of network devices and/or for the encryption of transmitted data. An IPsec communication between source and destination addresses is administered in accordance with a security association (SA), which is one or more rules that define the IPsec processing that is applied to the communication. IPsec is defined in RFC 2401 and other RFCs. Whether a packet is denied, permitted without IPsec processing or permitted with IPsec processing is determined by matching the attributes of a packet with the security rules in a security policy database (SPD). To make this determination the known art searches both static and dynamic rules in the order of most specific to least specific attributes for both outgoing and incoming packets. A set of static rules is essentially a security policy. Static rules are predefined and generally do not change very often. Dynamic rules are rules that are negotiated between nodes during IKE (Internet Key Exchange) processing and are added to the security policy database in a dynamic fashion as needed. U.S. Pat. No. 6,347,376 to International Business Machines describes a preferred method of searching the static and dynamic rules of an SPD. This patent is incorporated herein by reference in its entirety.

There are inherent incompatibilities between network address or port translation and IPsec processing. These incompatibilities are a barrier to deployment of IPsec. RFC 3715 recognizes and discusses some of these incompatibilities, but offers no general solutions. For example, Section 4.1 of RFC 3715 refers to a limited solution proposed in RFC 3456, "Dynamic Host Configuration Protocol (DHCPv4, Configuration of IPsec Tunnel Mode"), but states that a more general solution is needed. In addition, Section 5 of RFC 3948 entitled "UDP Encapsulation of IPsec ESP Packets" from the IPsec working group of IETF also addresses some of the incompatibility problems. Particularly, Section 5.2 of the RFC describes briefly a problem in determining what IPsec security associations to use on connections to clients served by a NAT. This Section also describes another problem in allowing a clear text connection to a client behind a NAPT when the NAPT also handles IPsec traffic.

The present invention is directed to the problem of avoiding duplicate sources when clients are served by a NAPT. No solutions are provided for this problem by any of the related IETF RFC documents. For purposes of this specification, duplicate sources are defined as packets having the same source address (e.g., an IP address of a NAPT assigned to an IPsec encapsulated original packet), the same transport protocol and the same original source port number (i.e., a port number in the transport header of the IPsec encapsulated packet).

Duplicate sources result in duplicate connections that breech network integrity. For example, packets can be sent to the wrong destination.

RFC 3947 entitled "Negotiation of NAT-Traversal in the IKE" describes what is needed in the IKE (Internet Key Exchange) phases 1 and 2 for the NAT traversal support. This includes detecting if both ends in a packet communication support NAT traversal, and detecting if there are one or more NATs along the path from host to host. It also covers how to negotiate the use of User Datagram Protocol (UDP) encapsulated IPsec packets in the IKE Quick Mode and describes how to transmit an original source IP address to the other end if needed". The UDP is defined in RFC 768. RFC 3948, "UDP Encapsulation of IPsec ESP Packets", defines methods to encapsulate and decapsulate ESP (Encapsulating Security Payload) packets inside of UDP packets for the purpose of traversing NATs. ESP is defined in RFC 2406. ESP is designed to provide a mix of security services in IPv4 and IPv6.

SUMMARY OF THE INVENTION

The invention is directed to preventing duplicate sources of packets in connections that use source addresses, protocols and source port numbers to identify source applications that are served by a NAPT. When a packet is received at a server, a determination is made as to whether the packet is a UDP packet that encapsulates an ESP packet whose transmission path contains a network address port translator (NAPT). In such a case, the original packet is decapsulated to obtain an original source port and original transport protocol. A source port mapping table (SPMT) is searched for an association between the NAPT source IP address, the original source port number, and the original transport protocol associated with the NAPT source IP address and translated source port number. If an incorrect association is found the packet is rejected as representing an illegal duplicate source; that is, a second packet from a different host served by a NAPT that has the same source IP address, source port number and protocol.

In the preferred embodiment, Network Address Port Translator (NAPT) host entries in the SPMT at the server are dynamically built in response to Internet Key Exchange (IKE) messages from internet hosts. Each NAPT host entry contains the source IP address of the NAPT, and a source port assigned by the NAPT. Source port entries in the SPMT are dynamically built as encrypted packets arrive and are decrypted and associations are established between the source port entries and the NAPT host entries of the SPMT. Each source port entry contains a source IP address of a NAPT, an original source port number and an original protocol.

BRIEF DESCRIPTION OF THE DRAWINGS

The invention will be better understood by reference to the drawings in which

FIG. 3 shows an illustrative embodiment of the Source Port Mapping Table (SPMT);

FIG. 4 shows a NAPT translated packet that encapsulates an encrypted original packet;

FIG. 5 shows the packet of FIG. 4 after decryption;

FIGS. 6 and 7 correspond to FIGS. 4 and 5, respectively, and show a second packet on the same path as the earlier packet that represents an illegal duplicate source caused by the inclusion of a NAPT in the transmission path;

FIG. 8 is a flowchart of the creation of NAPT host entries in the SPMT;

FIG. 9 is a flowchart showing options that are available when an inbound packet first arrives at a destination host;

FIG. 10 is a flowchart showing the processing of an inbound packet that both encapsulates an encrypted original packet and has passed through an NAPT.

DETAILED DESCRIPTION

Figure 1:
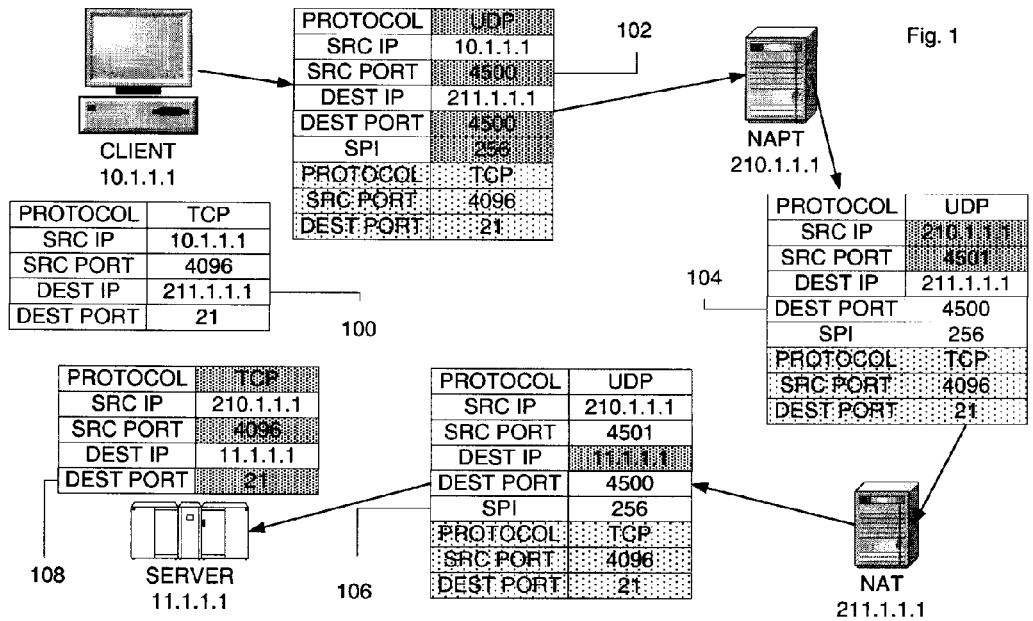
FIG. 1 shows a packet progressing from a client, through a NAPT to a destination host and the changes to the packet headers and contents as the packet progresses.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Although the problems addressed by the invention exist for both transport mode and tunnel mode in Internet transmissions, the disclosed embodiment is directed to transport mode. A small variation to be described adapts the transport mode disclosure for operation in tunnel mode.

In the preferred embodiment, the invention is implemented in software. As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having program code means embodied in the medium for use by or in connection with a computer or any instruction execution system. In the context of this document, a computer-usable or computer-readable medium can be any means that can contain, store, communicate, propagate, or transport the program for use by or in connection with the instruction execution system, apparatus, or device. The medium can be, for example, but is not limited to, an electronic, magnetic, optical, electromagnetic, infrared, or semiconductor system, apparatus, device, or propagation medium. More specific examples (an incomplete list) of the computer-readable medium would include an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

In this description, like numbers refer to like elements throughout.

IPsec processing can be used to authenticate or to encrypt the contents of packets for security purposes. Authentication and encryption can both be applied to a packet or either can be applied separately. To simplify this presentation, the description of IPsec processing discusses the encapsulation and decapsulation of the packets in terms of encryption and decryption. The processing described is equally valid if authentication is being applied either alone or in conjunction with encryption.

When IPsec processing is applied to outgoing packets from a source client, the processing encrypts the original source and destination ports and the protocol field and encapsulates this encrypted material into a UDP packet. The original client source IP address is retained in the UDP packet, but the source port number is set to 4500 as prescribed by RFC 3948 "UDP Encapsulation of IPsec ESP packets". If the UDP packet then passes through a NAPT, the NAPT performs further transformations. These transformations are described in detail below with respect to FIGS. 1 and 2. Specifically, the NAPT substitutes it's own IP address for the client source IP address, assigns a new unique port number to the UDP header and keeps track of these translations so that return packets can be mapped to the original source. RFC 3948 describes a scheme in which the original source port number in a TCP or UDP packet is not changed by the NAPT device, since it is part of the original transport header that is now encrypted as part of the IPsec ESP payload. The port number in the UDP header that is added for UDP encapsulation is changed instead as mentioned above. When such an IPsec packet is received by a server and decrypted, the original source and destination ports of the packet are revealed. For packets that are not processed through IPsec, the NAPT device translates the original source IP address and source port. For unencrypted packets, NAPTs ensure that there are no duplicate connections (duplicate sources).

Figure 2:
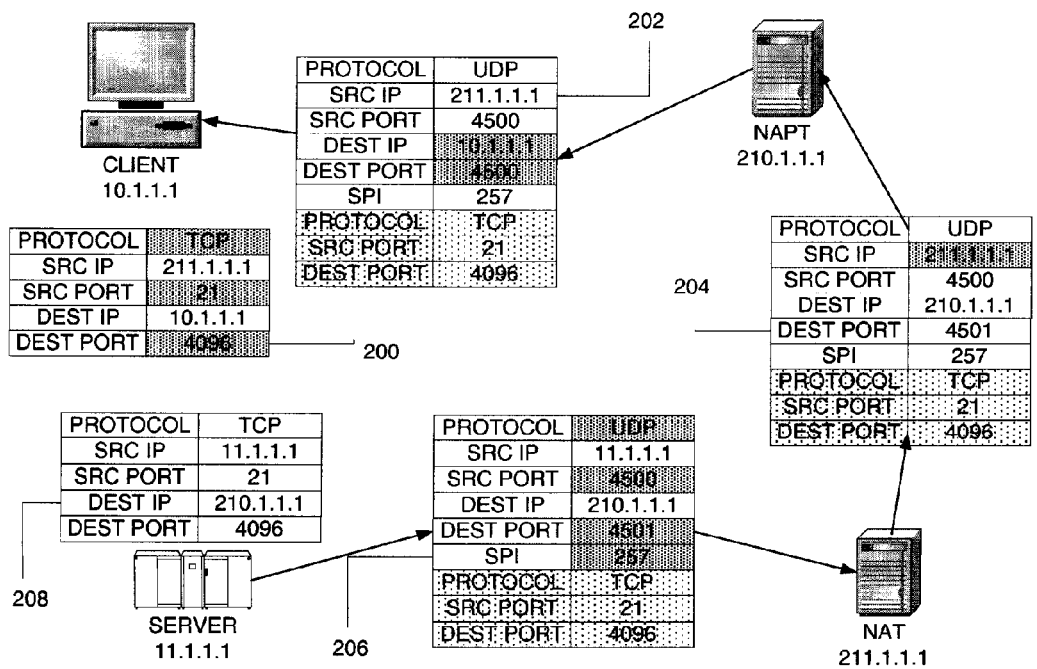
FIG. 2 shows a return packet responsive to the packet of FIG. 1.

FIG. 1 shows a packet progressing from a client 10.1.1.1, through a NAPT 210.1.1.1 and a NAT 211.1.1.1 to a destination host 11.1.1.1 and the changes to the packet headers and contents as the packet progresses. FIG. 2 illustrates the progress of the return packet in the reverse direction, from server to client. With reference to FIG. 1, the client at IP address 10.1.1.1 sends an encrypted packet destined for the server at IP address 11.1.1.1. The original contents of the packet before processing by IPsec are shown at 100. The left column of 100 describes a field type of the packet, while the right column shows the field contents. Note that the destination IP address at 100 is 211.1.1.1, which is the public address of the NAT in front of the real destination server 11.1.1.1. It is the responsibility of NAT 211.1.1.1 to map packets to its backend servers such as 11.1.1.1. At 100, the source and destination ports are illustratively set to 4096 and 21, respectively. The contents of the packet after IPsec processing are shown at 102. The lightly shaded portion at the bottom of the packet 102 illustrates the portion encrypted by IPsec. The heavier shaded portions of 102 (and the packet contents at other points of the transmission path) illustrate fields that have changed or have been added at that point in the transmission. At 102, the real source and destination ports are encrypted values of 4096 and 21 by IPsec and are not readable at this point. IPsec processing has added a UDP header to indicate that this is an IPsec packet that encapsulates the ports and protocol of the original client packet. The source and destination ports in the clear text UDP header added by IPsec are set to 4500 as specified in RFC 3948. An SPI (Security Parameter Index) field is illustratively set to 256. The SPI field, together with a security protocol and a destination address, points to a security association between client 10.1.1.1 and server 11.1.1.1 that governs the encryption algorithm and other security parameters between these entities.

The packet at 102 is translated by the NAPT at IP address 210.1.1.1 to result in the packet shown at 104. At this point the NAPT 210.1.1.1 has changed the source IP address to reflect its own address of 210.1.1.1. The NAPT also sets a new unique source port number. In FIG. 1, the selected source port number is illustratively changed from 4500 to 4501. The NAPT 210.1.1.1 keeps track of this translation for return packets from the server 11.1.1.1 and for future outbound packets from client IP 10.1.1.1 and source port 4500.

The packet at 104 is re-translated by NAT 211.1.1.1 into the input packet for server 11.1.1.1. This input packet is shown at 106. Essentially, the destination IP address of the packet is mapped by NAT 211.1.1.1 into the real destination address 11.1.1.1 of the destination server. The IPsec processing of the packet removes the UDP header added by the IPsec processing at the source 10.1.1.1 and restores the real source and destination port numbers. The restored packet, as shown at 108 is then delivered to the destination port (21 in this example) for application processing.

For completeness, FIG. 2 shows a return packet flow from server 211.1.1.1 to the original client 10.1.1.1. There is no need to discuss this packet flow in any detail because the duplicate source problem addressed by the invention cannot occur for return packets.

With reference again to FIG. 1, the packet at 108 contains as a source address the address of NAPT 210.1.1.1 and a source port number of 4096. However, it is possible that another client, say 10.1.1.2, behind NAPT 210.1.1.1 is also sending packets to host 11.1.1.1 from source port 4096. Therefore, because of the presence of a NAPT in the path between client 10.1.1.1 and host 11.1.1.1, there is a possibility of an illegal duplicate source that results in a conflict.

According to the invention, a Source Port Mapping Table (SPMT) is used to detect duplicate sources in which packets are received from clients or servers served by a NAPT. An illustrative SPMT is shown in FIG. 3 at 300. This table is built dynamically as Internet Key Exchange (IKE) packets are received at a server when an IPsec security association is established. With reference to FIG. 3, when IKE negotiates an IPsec security association that traverses a NAPT, the TCP/IP stack is notified to create a NAPT host entry such as 302 to represent the remote client, which is represented by the NAPT. This entry contains the source IP address of the NAPT (210.1.1.1 in this example) and the source port assigned to this client by the NAPT (4501 in this example). FIG. 3 shows a second illustrative NAPT client 304 having the same NAPT IP source address 210.1.1.1 and a different source port 4502 assigned by the NAPT. On the right side of SPMT 300 are source port entries. These entries are created as IPsec encoded packets arrive for which there is no existing entry. The process of adding source port entries occurs after IPsec decrypting has occurred. Associations 306 that map source port entries to NAPT host entries are created as the source port entries are created. A NAPT host entry is removed when the last security association is deleted that pertains to the entry. When a packet arrives and is decrypted, the source NAPT address, the source port of the original packet and the protocol of the original packet are available. The source port entries of the SPMT are searched for a match on these attributes. If a match is found, the associated NAPT host entry is checked for a match on the NAPT source address and the source port assigned by the NAPT. If these latter attributes mismatch, this means that two clients behind the source NAPT are attempting to use the same source port numbers. This represents a duplicate source and the second packet is rejected. If these latter attributes match, then the packet is allowed.

FIGS. 4 through 7 help illustrate the above discussion. FIG. 4 shows a packet coming from a source NAPT. The client address and port are assumed to be 10.1.1.1 and 4096, respectively, for illustration. 400 is the IP header updated by the NAPT. It contains the NAPT address 210.1.1.1 and a host destination host address 11.1.1.1. 402 is the encapsulating UDP header added by IPsec processing and updated by the NAPT. Source port 4500 has been changed to 4501 by the NAPT. 404 contains the Encapsulated Security Protocol (ESP) header added by IPsec processing. The TCP transport header 406 contains the original client source and destination ports, 4096 and 21. 408 contains the payload data followed by the ESP trailer. The transport header 406 and payload 408 are encrypted in accordance with IPsec processing. FIG. 5 represents the packet of FIG. 4 after decryption at the destination host. Note now that the source NAPT address 210.1.1.1 (from packet field 500), and the client source port 4096 and protocol (TCP) are now available from field 506. The source port entries of SPMT 300 are searched using these attributes. In this example, a match is found at 308. The corresponding association 306 points to NAPT host entry 302. The source NAPT address 210.1.1.1 and NAPT source port 4501 match this packet (the NAPT source port 4501 is available in the clear from field 402 of the incoming packet). Thus, this packet is associated with a correct connection and is accepted.

FIGS. 6 and 7 represent a second arriving duplicate source packet that will be rejected. This is because the NAPT source address 210.1.1.1 from field 700, the protocol from field 706 and the source client port 4096 match 308 of the source port entries of SPMT 300, but the associated NAPT entry 302 does not match the NAPT assigned port number of 4502 from field 602 of the incoming packet.

This process is now explained in more detail below in association with appropriate flowcharts.

FIG. 8 illustrates the initializing of the NAPT host entries of SPMT 300 during IKE negotiations. The IKE negotiation is represented at step 802. After the negotiation, step 804 sends a notification to the TCP/IP stack to create an associated NAPT host entry in SPMT 300. This notification contains the NAPT source address and port number retrieved from the IKE flows.

FIG. 9 begins the process of detecting a duplicate source when a data packet arrives at the destination host. Step 902 determines if the incoming packet contains an ESP packet encapsulated in a UDP header, and the source port in the UDP header is not the predefined UDP encapsulation port 4500. If the above is true, then the packet is using IPsec, either for encryption or authentication, and a NAPT is involved in the transmission path. If a packet is using a UDP protocol with a destination port of 4500 and the first four bytes contain non-zero data, then the packet is identified as a UDP encapsulated ESP packet. If the answer at step 902 is negative, then there are two alternative processing options, option 1 at 904 and option 2 at 906. These are both discussed below. Assuming that the answer at 902 is yes, then 908 continues at A in FIG. 10. In FIG. 10, step 1002 performs the required IPsec processing to decrypt the packet. As a result, the NAPT source address, the original client source port number, and the protocol are obtained in the clear as explained above. Step 1004 searches the source port entries of SPMT 300 on these attributes. At 1006, if a match is not found, a source port entry is created at step 1008 and inbound processing of the packet continues normally. If a match is found at step 1006, then step 1010 uses the corresponding association 306 to compare the NAPT assigned source address and port number from the corresponding NAPT host entry to the same attributes from the decrypted packet. If this comparison fails, the packet is rejected at 1011. If a match is obtained, the packet processing continues as normally at 1012.

Figure 11:
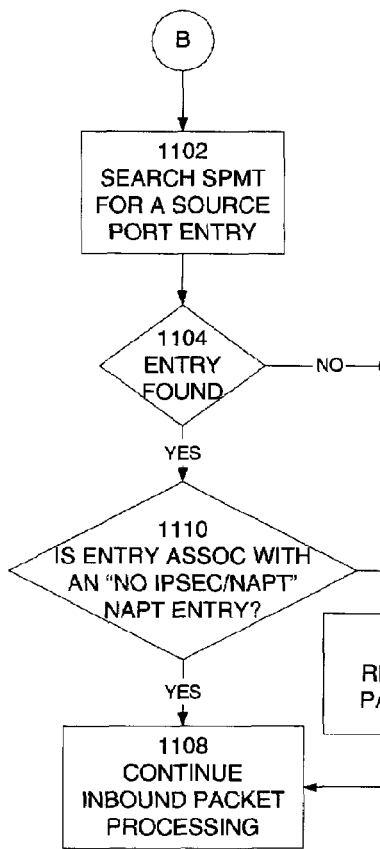
FIGS. 11 and 12 are flowcharts that show alternative ways of processing inbound packets that do not satisfy both conditions of encapsulation and passing through an NAPT.

Options 1 and 2 from FIG. 9 represent situations in which packets are sent in the clear (no IPsec processing) or there is no address translation (NAPT) in the path. However, duplicate sources are still possible. Both alternative options 1 and 2 detect such duplicate packets. The processing of option 1 begins at B of FIG. 11. This option processes all data packets through the SPMT table 300. This is done by adding another single NAPT host entry designated as "NO IPSEC/NAPT". When a packet arrives, the source port entries of SMPT 300 are searched as explained above. If no match is found, a source port entry is created at 1106 and associated with the "NO IPSEC/NAPT" NAPT host entry. If a matching source port entry is found at 1104, step 1110 determines if the corresponding association 306 points to the "NO IPSEC/NAPT" NAPT host entry. If so, the packet is allowed at step 1108. Otherwise, it is rejected at 1112. The advantage of this option 1 is simplicity. Its disadvantage is that all data traffic is processed through the SPMT table 300.

Figure 12:
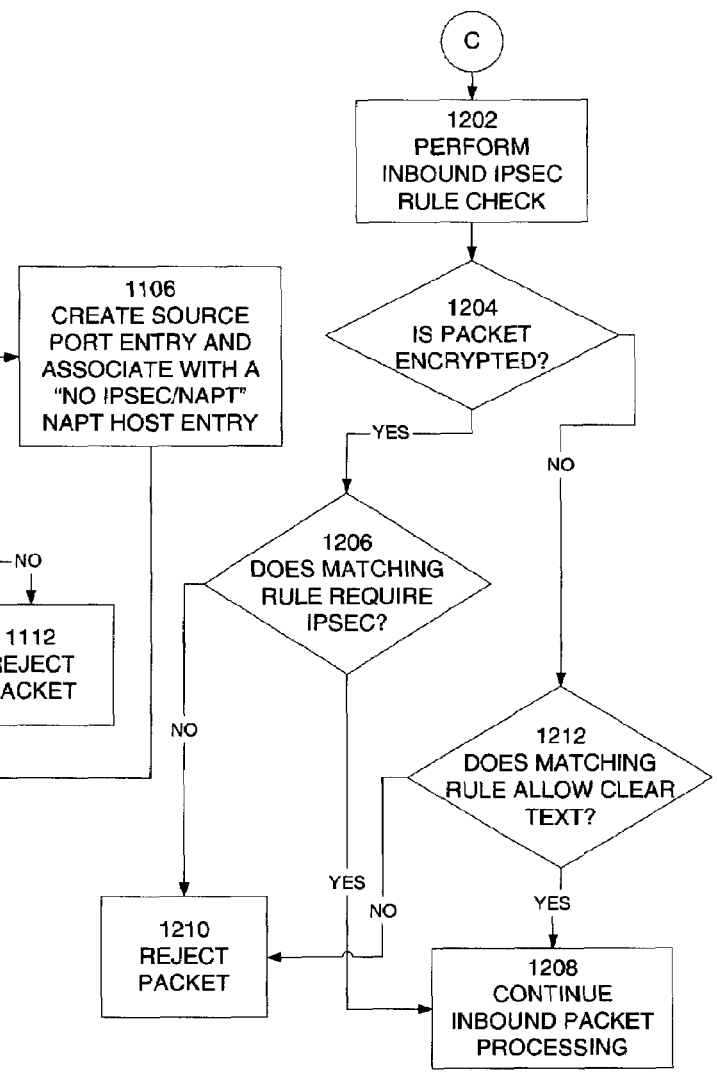

Option 2 uses inbound IPsec packet filtering to reject duplicate source packets. Once IPsec is in place at a host, all packets are processed through the IPsec rules table (the SPD), whether any packet is encrypted or not. This is to verify that unencrypted packets on a given connection are in fact allowed by the IPsec rule that governs the connection. The option 2 process begins at C of FIG. 12. The incoming packet is processed through the IPsec rule table (not shown) at step 1202. An example of how this is done in a preferred embodiment can be determined from the aforementioned U.S. Pat. No. 6,347,376. This patent is incorporated herein by reference in its entirety. If the packet is encrypted (step 1204), then step 1206 determines if the governing IPsec rule requires encryption. Assuming that is the case, the packet is allowed at 1208. Otherwise, it is rejected at 1210. If the packet is unencrypted at step 1204, then a determination is made at 1212 if the governing IPsec rule allows unencrypted packets and the packet is allowed or rejected accordingly.

In tunnel mode, the IPsec SA is not necessarily end-to-end. For example, an SA might be negotiated between a host and a gateway that serves multiple clients or servers. In tunnel mode a single NAPT address (which is the source IP address in the UDP encapsulating header) could potentially represent multiple hosts. In tunnel mode, the encapsulated, encrypted portion of a packet contains both the original IP address of the source and a transport header. For the purpose of this specification, the original IP address of the source in tunnel mode is called the inner source IP address. Because the inner source IP address is not globally unique, it is not usable for packet routing or for representing the source of a connection. The original source port, such as contained in the source port entries of SPMT 300, and the encapsulating source IP address with the UDP port alone, as described above for transport mode, might not be unique. To solve this, an additional field that contains the inner source IP address is added to the source port entries (e.g., 308) of the SPMT 300 in FIG. 3. The inner source IP address (not available in transport mode) when combined with the other values of the source port entries yield a unique identifier for hosts protected by a tunnel mode IPsec SA. The inner source IP address is added to the source port entry as part of step 1008. When a tunnel mode packet arrives, the source port entries of SPMT are searched as described in step 1004 to find an association to a NAPT host entry, and step 1010, in addition to what has already been described, verifies that the inner source client IP address obtained from the decrypted packet is the same as the client IP address in the source port entry. If this verification fails, the packet is rejected Artisans in the field of this invention will quickly realize that the preferred and disclosed embodiment can have many minor variations that are within the intent and scope of the teaching. It is the intent of the inventor to encompass these variations to the extent possible in accordance with the state of the applicable relevant art in the field of the invention. For example, the ICMP protocol does not use port numbers; rather, they use query identifiers. With respect to the invention as disclosed and claimed, query identifiers are equivalent to port numbers.

What is claimed is:

1. A method of preventing duplicate sources in a network protocol that uses network addresses, protocols and port numbers to identify applications, comprising
    a) receiving a packet at a server,
    b) determining if the packet has been translated by a network address port translator and contains an IPsec encapsulated packet,
    c) if the packet has been translated and contains an IPsec encapsulated packet, processing the packet to obtain original connection information regarding a sender of the packet and searching a source port mapping table (SPMT) for an association between NAPT translated connection information and the original connection information, and
    d) rejecting the packet if the result of step c) reveals a duplicate source, wherein the duplicate source is revealed if the original connection information is matched in the SPMT and is not associated in the SPMT with the NAPT translated connection information contained in the packet.

2. The method of claim 1 wherein the source port mapping table contains NAPT host entries that are created when security associations between clients and servers are negotiated, and source port entries that are created as non-duplicate source packets arrive from remote locations for which there are no existing entries with mappings between the source port entries and the NAPT host entries that are used to detect duplicate sources.

3. The method of claim 2 further comprising establishing a NO IPSEC/NAPT host entry in the source port mapping table to represent all incoming packets that fail step b) of claim 1 and creating a source port entry for all such incoming packets that don't have a source port entry and mapping the source port entry to the NO IPSEC/NAPT host entry, and rejecting any such incoming packet that already has a source port entry in the source port mapping table that is not mapped to the NO IPSEC/NAPT host entry.

4. A method of preventing duplicate sources in a network protocol that uses network addresses, protocols and port numbers to identify applications, comprising
   a) receiving a packet at a server,
   b) determining if the packet is an IPsec encapsulated packet,
   c) if the packet is an IPsec encapsulated packet, determining if the transmission path of the packet contains a network address port translator (NAPT),
   d) if the transmission path of the packet contains a NAPT, decapsulating the IPsec encapsulated packet to obtain an original source port number and original packet protocol regarding a sender of the packet,
   e) searching a source port mapping table (SPMT) for an association between the NAPT source address, the original source port, and the original packet protocol to the NAPT source address and NAPT assigned port number, and
   f) If an association is found at step e) between the NAPT source address, the original source port, and the original packet protocol to a different NAPT assigned port number than contained in the packet, rejecting the packet.

5. The method of claim 4 wherein step b) further comprises determining if the packet contains an encapsulated security payload (ESP) header encapsulated by a User Datagram Protocol (UDP) header.

6. The method of claim 4 wherein step c) further comprises determining if the encapsulated UDP header contains a source port number other than 4500 and a destination port number equal to 4500.

7. The method of claim 4 further comprising
   dynamically building Network Address Translator (NAPT) host entries in the SPMT at the server in response to Internet Key Exchange (IKE) messages from internet hosts, each NAPT host entry containing the source IP address of the NAPT, and the source port number assigned by the NAPT.

8. The method of claim 7 further comprising dynamically building source port entries in the SPMT as IPsec packets arrive and are processed, each source port entry containing a source address of a NAPT, an original source port number and an original protocol, and establishing associations between the source port entries and the NAPT host entries of the SPMT.

9. The method of claim 8 wherein the step of establishing associations further comprises establishing each association dynamically when an IPsec packet arrives for which there is no association.

10. The method of claim 9 further comprising adding a single host "No IPSEC/NAPT" entry to the SPMT for association with all packets that do not contain an ESP header or have not passed through a NAPT, forming an association between a source port entry of the SPMT and the "No IPSEC/NAPT" entry when a packet arrives that does not contain an ESP header or has not passed through a NAPT and does not have an association, and rejecting a packet that does not contain an ESP header or has not passed through a NAPT if there is already an association established for the matching source port entry that does not point to the "No IPSEC/NAPT" entry.

11. The method of claim 4 further comprising if the transmission path of an arriving packet does not contain a NAPT or the arriving packet is not an IPsec packet, searching a security table of rules for a rule match that governs the rejection or acceptance of the packet, rejecting the packet if the packet is an IPsec packet and the matching rule does not require IPsec processing, and rejecting the packet if the packet is not an IPsec packet and the matching rule requires IPsec processing.

* * * * *

UNITED STATES PATENT AND TRADEMARK OFFICE
CERTIFICATE OF CORRECTION

PATENT NO.      : 7,656,795 B2  
APPLICATION NO. : 10/907661  
DATED           : February 2, 2010  
INVENTOR(S)     : Jakubik et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Thirtieth Day of November, 2010

David J. Kappos  
*Director of the United States Patent and Trademark Office*